(12) United States Patent
Westwick et al.

(10) Patent No.: US 9,710,031 B2
(45) Date of Patent: Jul. 18, 2017

(54) ANALOG INTERFACE FOR A MICROPROCESSOR-BASED DEVICE

(75) Inventors: Alan L. Westwick, Austin, TX (US); Thomas S. David, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 1936 days.

(21) Appl. No.: 12/981,741

(22) Filed: Dec. 30, 2010

(65) Prior Publication Data

US 2012/0173787 A1 Jul. 5, 2012

(51) Int. Cl.
*G06F 1/00* (2006.01)
*G06F 13/14* (2006.01)
*G06F 1/26* (2006.01)

(52) U.S. Cl.
CPC .............. *G06F 1/26* (2013.01); *G06F 1/00* (2013.01); *G06F 13/14* (2013.01)

(58) Field of Classification Search
CPC ............................... G06F 13/00; G06F 13/20
USPC ........ 710/300, 105, 305, 313; 713/310, 340; 326/33, 80, 82
See application file for complete search history.

(56) References Cited

U.S. PATENT DOCUMENTS

| | | | | |
|---|---|---|---|---|
| 5,490,117 A | * | 2/1996 | Oda et al. | 365/226 |
| 5,663,664 A | * | 9/1997 | Schnizlein | 326/83 |
| 5,818,781 A | * | 10/1998 | Estakhri et al. | 365/226 |
| 5,974,476 A | * | 10/1999 | Lin et al. | 710/14 |
| 6,420,924 B1 | * | 7/2002 | Lundberg | 327/333 |
| 6,615,301 B1 | * | 9/2003 | Lee et al. | 710/106 |
| 7,212,067 B2 | * | 5/2007 | Pasternak | 327/541 |
| 7,359,995 B2 | * | 4/2008 | Su et al. | 710/15 |
| 7,453,741 B2 | * | 11/2008 | Kim et al. | 365/189.09 |
| 8,254,200 B2 | * | 8/2012 | Eid et al. | 365/226 |
| 8,289,798 B2 | * | 10/2012 | Coteus et al. | 365/226 |
| 2005/0024128 A1 | | 2/2005 | Pasternak | |
| 2005/0179421 A1 | | 8/2005 | Wang et al. | |
| 2006/0041770 A1 | | 2/2006 | Lougee | |
| 2006/0164054 A1 | * | 7/2006 | Wang et al. | 323/282 |
| 2008/0151456 A1 | | 6/2008 | Julicher | |
| 2008/0291071 A1 | | 11/2008 | Morrell | |
| 2009/0167357 A1 | * | 7/2009 | Lai et al. | 326/82 |

FOREIGN PATENT DOCUMENTS

EP 1176496 1/2002

OTHER PUBLICATIONS

PCT Notification of Transmittal of the Internal Search Report and the Written Opinion of the Internal Searching Authority, or the Declaration, dated Aug. 14, 2013.

* cited by examiner

*Primary Examiner* — Khanh Dang
(74) *Attorney, Agent, or Firm* — Trop, Pruner & Hu, P.C.

(57) ABSTRACT

An apparatus includes an integrated circuit, which includes a processor and a driver. The integrated circuit is fabricated by a process that establishes a nominal maximum voltage for components of the integrated circuit. The driver is adapted to selectively electrically couple a voltage that is higher than the nominal maximum voltage to an external terminal of the integrated circuit.

12 Claims, 6 Drawing Sheets

ANALOG INTERFACE FOR A MICROPROCESSOR-BASED DEVICE

BACKGROUND

The disclosure generally relates to an analog interface for a processor-based device.

Electronic systems typically employ the use of current drivers for purposes of using relatively low or no current signaling to control various devices in the system. A typical current driver may include a transistor, such as a metal-oxide-semiconductor field-effect-transistor (MOSFET), to control the current to the device. The MOSFET conducts current through its drain-source path, depending on a voltage between the gate and source terminals of the MOSFET

SUMMARY

In an exemplary embodiment of the invention, an apparatus includes an integrated circuit, which includes a processor and a driver. The integrated circuit is fabricated by a process that establishes a nominal maximum voltage for components of the integrated circuit. The driver is adapted to selectively electrically couple a voltage that is higher than the nominal maximum voltage to an external terminal of the integrated circuit.

In another exemplary embodiment of the invention, a technique includes using an integrated circuit that includes a processor and a driver to control communication of power to a load that is external to the integrated circuit. The integrated circuit is fabricated by a process that establishes a nominal maximum voltage for components of the integrated circuit. The technique includes selectively operating the driver to couple a voltage higher than the nominal maximum voltage to the load.

In yet another exemplary embodiment of the invention, an apparatus includes an integrated circuit that includes a processor, a driver and a serial bus interface that is adapted to be coupled to a power line of a serial bus. The processor is adapted to control the driver to selectively couple the power line of the serial bus to circuitry that is external to the integrated circuit.

Advantages and other features of the invention will become apparent from the following drawing, description and claims.

DETAILED DESCRIPTION

Figure 1:
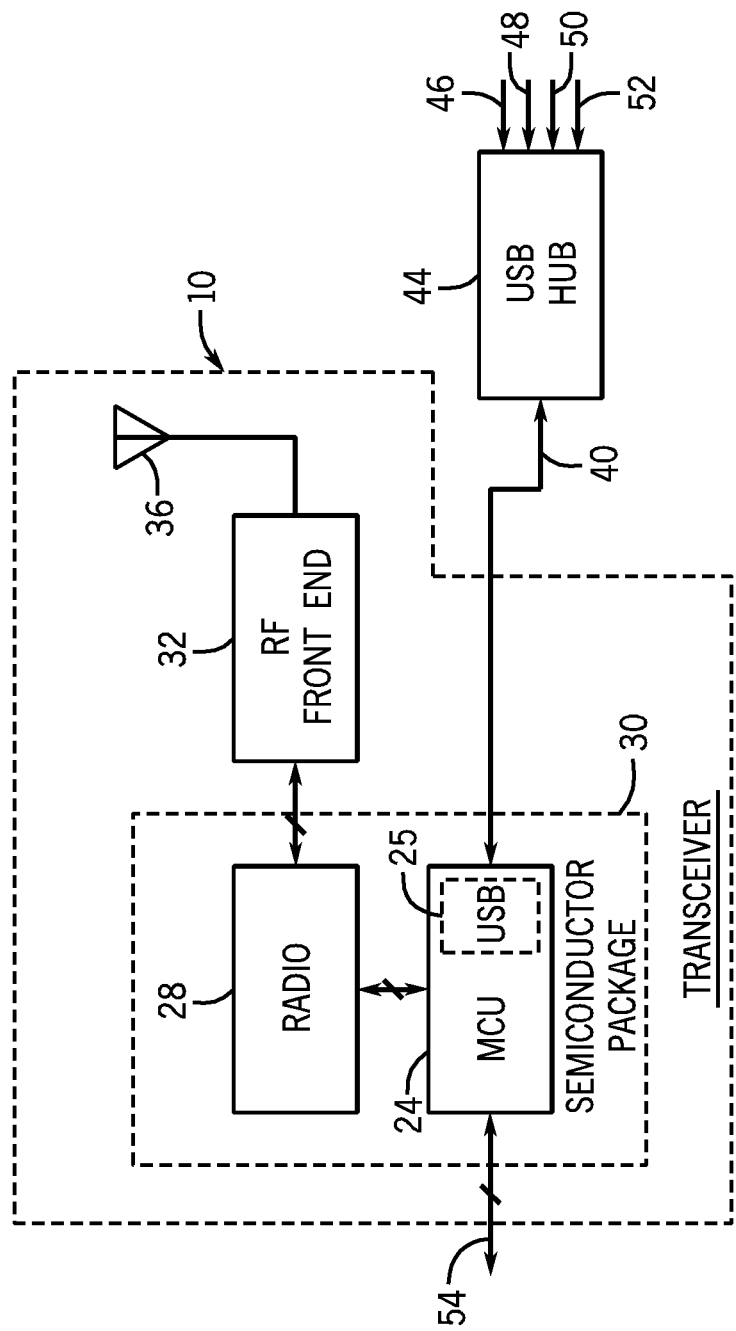
FIG. 1 is a schematic diagram of a transceiver system according to an embodiment of the invention.

Referring to FIG. 1, in accordance with embodiments of the invention disclosed herein, an embedded microcontroller unit (MCU) 24 may be used in a variety of applications, such as applications in which the MCU 24 controls various aspects of a transceiver 10 (as a non-limiting example). In this regard, the MCU 24, for this particular example, may be part of an integrated circuit (IC), or semiconductor package 30, which also includes a radio 28. As a non-limiting example, the MCU 24 and the radio 28 may collectively form a packet radio, which processes incoming and outgoing streams of packet data. To this end, the transceiver 10 may further include a radio frequency (RF) front end 32 and an antenna 36, which receives and transmits RF signals (frequency modulated (FM) signals, for example) that are modulated with the packet data.

As non-limiting examples, the transceiver 10 may be used in a variety of applications that involve communicating packet stream data over relatively low power RF links and as such, may be used in wireless point of sale devices, imaging devices, computer peripherals, cellular telephone devices, etc. As a specific non-limiting example, the transceiver 10 may be employed in a smart power meter which, through a low power RF link, communicates data indicative of power consumed by a particular load (a residential load, for example) to a network that is connected to a utility. In this manner, the transceiver 10 may transmit packet data indicative of power consumed by the load to mobile meter readers as well as to an RF-to-cellular bridge, for example. Besides transmitting data, the transceiver 10 may also receive data from the utility or meter reader for such purposes (as non-limiting examples) as inquiring as to the status of various power consuming devices or equipment; controlling functions of the smart power meter; communicating a message to a person associated with the monitored load, etc.

As depicted in FIG. 1, in addition to communicating with the radio 28, the MCU 24 may further communicate with other devices and in this regard may, as examples, communicate over communication lines 54 with a current monitoring and/or voltage monitoring device of the smart power meter as well as communicate with devices over a serial bus 40. In this manner, the serial bus 40 may include data lines that communicate clocked data signals, and the data may be communicated over the serial bus 40 data in non-uniform bursts. As a non-limiting example, the serial bus may be a Universal Serial Bus (USB) 40, as depicted in FIG. 1, in accordance with some embodiments of the invention. As described herein, in addition to containing lines to communicate data, the serial bus, such as the USB 40, may further include a power line (a 5 volt power line, for example) for purposes of providing power to serial bus devices, such as the MCU 24. Various USB links 46, 48, 50 and 52 may communicate via a hub 44 and USB 40 with the transceiver 10 for such purposes as communicating with a residential computer regarding power usage of various appliances, communicating with these appliances to determine their power usages, communicating with the appliances to regulate their power usages, etc. For purposes of communicating with the USB 40, the MCU 24 has an integrated USB interface 25, in accordance with some embodiments of the invention.

Figure 2:
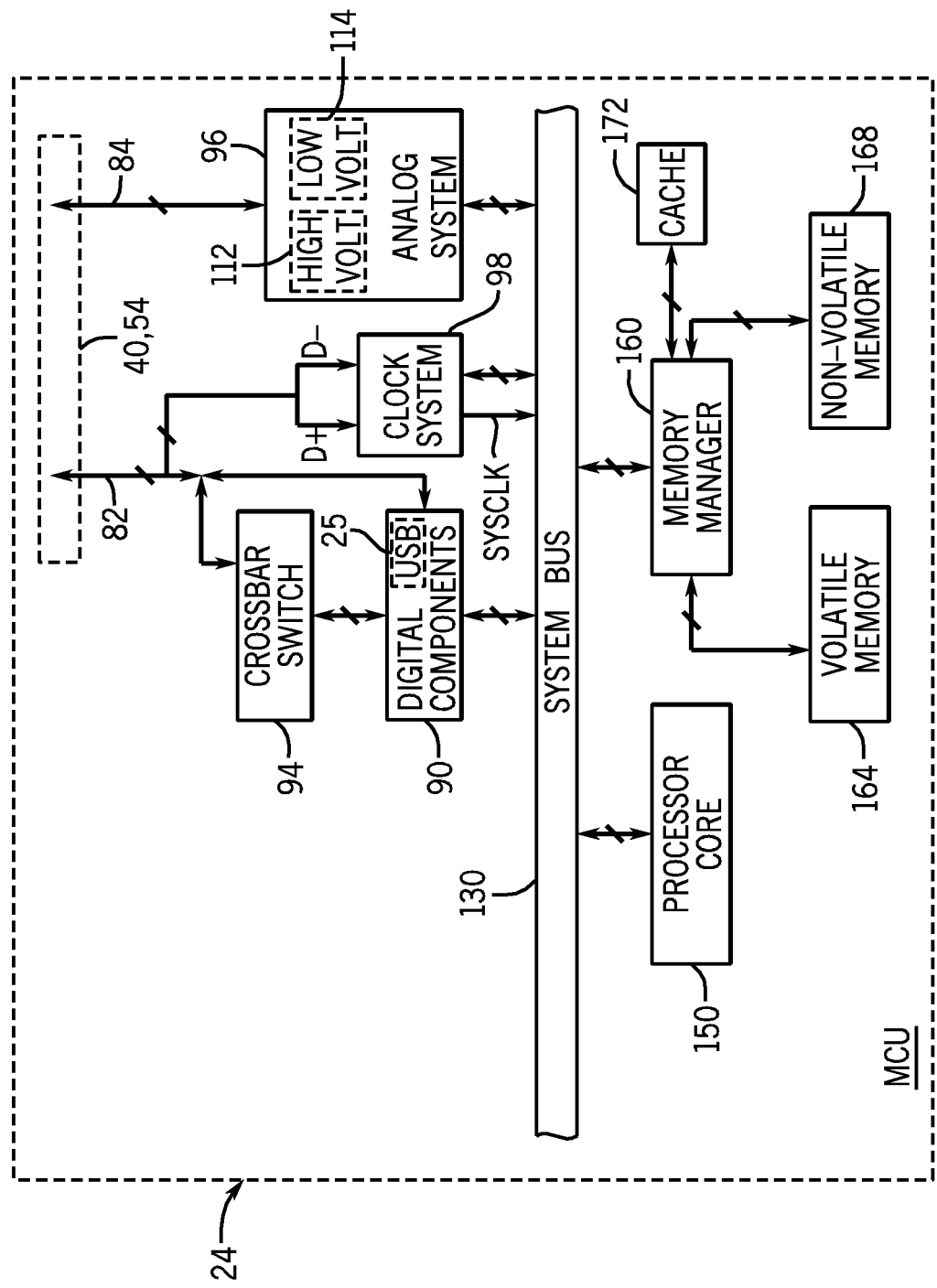
FIG. 2 is a schematic diagram of a microcontroller unit of the system of FIG. 1 according to an embodiment of the invention.

In accordance with embodiments of the invention, the MCU 24 is a "system on a chip," which includes various components, such as the components that are depicted in FIG. 2, which may be fabricated on the same die. Referring to FIG. 2, among these components, the MCU 24 includes a processor core 150. As a non-limiting example, the processor core 150 may be a 32-bit core, such as the Advanced RISC Machine (ARM) processor core, which executes a Reduced Instruction Set Computer (RISC) instruction set. In general, the processor core 150 communicates with various other system components of the MCU 24, such as a memory controller, or manager 160, over a system bus 130. In general, the memory manager 160 controls access to various memory components of the MCU 24, such as a cache 172, a non-volatile memory 168 (a Flash memory, for example) and a volatile memory 164 (a static random access memory (SRAM), for example).

For purposes of producing clock signals for use by the components of the MCU 24, such as the processor core 150, the MCU 24 includes a clock system 98. As depicted in FIG. 2, for purposes of an example, the clock system 98 is depicted as providing a system clock signal called "SYSCLK" in FIG. 2 to the system bus 130. In general, the clock system 98 recovers a clock signal used in the communication of bursty data on data lines (labeled as the "D+" and "D−" in FIG. 2) over the USB 40 and may use this recovered clock signal as the system clock signal.

The MCU 24 includes various digital peripheral components 90, such as (as non-limiting examples) the USB interface 25, a programmable counter/timer array (PCA), a universal asynchronous receiver/transmitter (UART), a system management bus (SMB) interface, a serial peripheral interface (SPI), etc. The MCU unit 24 may include a crossbar switch 94, which permits the programmable assigning of the digital peripheral components 90 to digital output terminals 82 of the MCU 24. In this regard, the MCU 24 may be selectively configured to selectively assign certain output terminals 82 to the digital peripheral components 90.

In accordance with embodiments of the invention, the MCU 24 includes an analog system 96, which communicates analog signals on external analog terminals 84 of the MCU 24 and generally forms the MCU's analog interface. As an example, the analog system 96 may include various components that receive analog signals, such as analog-to-digital converters (ADCs), comparators, etc.; and the analog system 96 may include components (supply regulators) that furnish analog signals (power supply voltages, for example) to the terminals 84, as well as components, such as current drivers (such as drivers 210 described below in connection with FIG. 3), that may be used to selectively electrically couple certain terminals 84 together.

Figure 3:
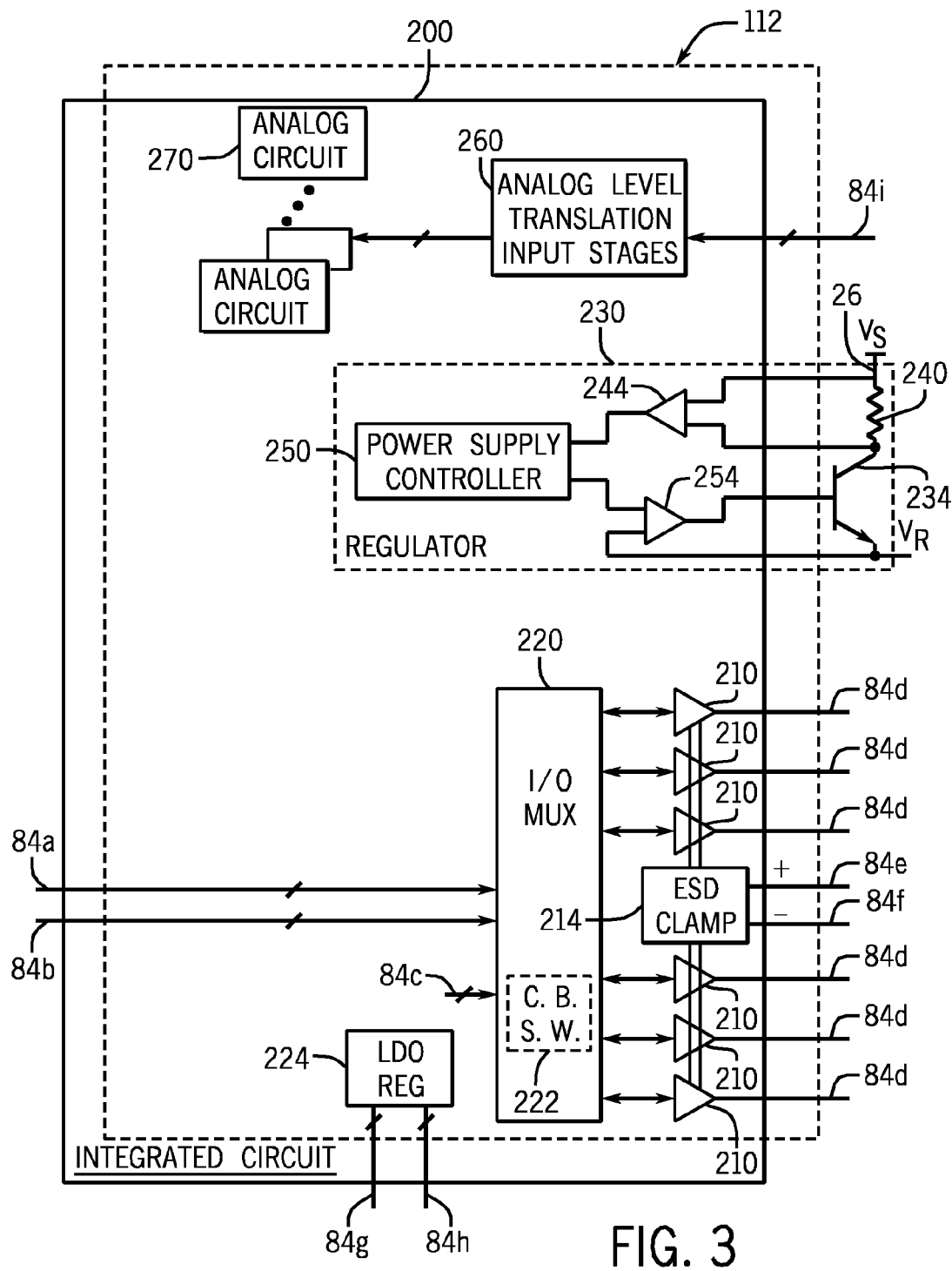
FIG. 3 is a schematic diagram of an analog interface of the microcontroller unit according to an embodiment of the invention.

As depicted in FIG. 2, in general, the analog system 96 includes a high voltage subsystem 112 and a low voltage subsystem 114. The high voltage subsystem 112 contains circuitry (such as the current driver circuits, or "drivers 210," which are depicted in FIG. 3), which are constructed to receive and operate on voltages that exceed the nominal maximum voltage that is established by the MCU's semiconductor fabrication process. As a comparison, the low voltage subsystem 114 generally includes circuitry that is constructed to receive and operate on voltages that remain at or below the maximum voltage. As a non-limiting example, the MCU's semiconductor fabrication process may impose a maximum voltage of 3.6 volts, which means that in order to avoid damage to circuit components of the MCU (or generally integrated circuit), in general, the on-chip voltages should not exceed 3.6 volts. Although the voltages in the low voltage subsystem 114 comply with the 3.6 volt limit and remain at or below 3.6 volts, the voltages in the high voltage subsystem 112 may substantially exceed the 3.6 volt limit, and as such, as a non-limiting example, components of the high voltage subsystem 112 may receive and operate on voltages that exceed 6 volts, for example. It is noted that the maximum voltage may be a voltage other than 3.6 volts and/or the voltages in the high voltage subsystem 112 may have values other than 6 volts, in accordance with other embodiments of the invention.

For a given semiconductor fabrication process, the maximum voltage is generally governed by the maximum voltage that may be applied across the terminals of the various electrical components that are available in that process without causing temporary or permanent damage to those components, and without causing a substantial degradation in their electrical performance. As described blow, the driver 210 is constructed such that the full supply voltage never appears across any two terminals of any component of the driver 210. As a non-limiting example of such a design, two circuit components may be placed in series, so that approximately half of the supply voltage will appear across each component; and such an arrangement may allow the circuit to operate from a supply voltage that is up to approximately double the maximum allowable voltage for a single component.

FIG. 3 depicts the high voltage subsystem 112 in accordance with some embodiments of the invention. In general, the high voltage subsystem 112 includes various circuits that are part of an integrated circuit 200, which also contains the other circuitry of the MCU 24. Thus, the high voltage subsystem 112 and processor core 150 as well as the other components of the MCU 24 are part of the same integrated circuit 200 (i.e., part of the same die or at least part of the same semiconductor package), in accordance with some embodiments of the invention.

Figure 5:
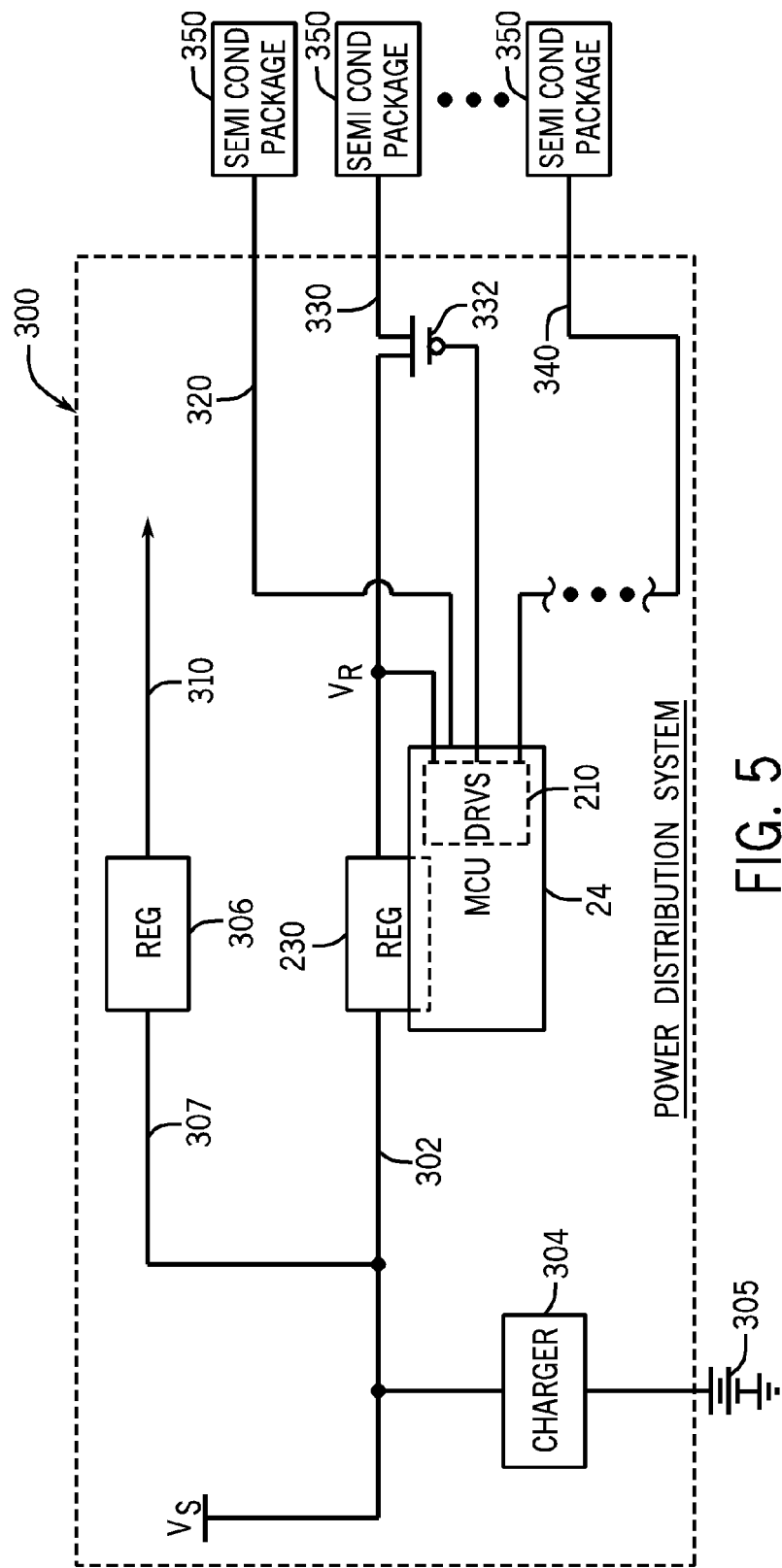
FIG. 5 is a schematic diagram of a microcontroller unit-based power distribution system according to an embodiment of the invention.

Referring to FIG. 3 in conjunction with FIG. 1, among its features, the high voltage subsystem 112 includes at least part of a supply voltage regulator 230, which receives (via a power supply rail 26) a power supply voltage (called "$V_S$" herein). As described further below, in accordance with some embodiments of the invention, the $V_S$ supply voltage may be derived from the USB bus 40. The regulator 230 converts the $V_S$ supply voltage into a lower, regulated supply voltage (called "$V_R$" herein), which, as described further below in connection with FIG. 5 is used to supply power to components of the transceiver 10, either directly or indirectly through further regulation. In accordance with some embodiments of the invention, the $V_S$ supply voltage is above the nominal maximum voltage established by the integrated circuit's fabrication process; and the $V_R$ supply voltage is below the maximum voltage.

In accordance with some embodiments of the invention, the regulator 230 is formed from components that are part of the integrated circuit 200 (and MCU 24) and components that are external to the integrated circuit 200 (and MCU 24). In this manner, the components of the regulator 230, which may dissipate relatively large amounts of power are disposed external to the integrated circuit 200, and the lower power dissipating components of the regulator 230 are part of the integrated circuit 200 (i.e., are integrated within the integrated circuit 200). Among the potential advantages of placing high power dissipation components external to the integrated circuit 200, the integrated circuit 200 may have relatively lower internal temperatures, a smaller size and, in general, a lower cost, as compared to an integrated circuit that contains such components. Additional and/or other advantages are possible, in accordance with other embodiments of the invention.

For the example that is depicted in FIG. 3, in accordance with some embodiments of the invention, the regulator 230 is a linear pass regulator and is generally fabricated as part of the integrated circuit 200, except for an external pass transistor 234 and an associated external current sensing resistor 240, which senses the current in the main current path of the transistor 234. As a non-limiting example, the transistor 234 may be an NPN bipolar junction transistor (BJT), which has a collector-to-emitter voltage that is regulated to form the $V_R$ regulated voltage from the $V_S$ supply voltage. More specifically, the emitter terminal of the BJT 234 provides the $V_R$ supply voltage, and the collector terminal on the BJT 234 is coupled to the power supply rail 26. For this example, the current sensing resistor 240 is coupled between the power supply rail 26 and the collector terminal of the BJT 234 for purposes of providing a relatively small voltage that is indicative of the current that passes through the collector-to-emitter current path of the BJT 234. This sensed voltage is provided to components of the regulator 230, such as amplifiers 244 and 254 and a power supply controller 250 that are all fabricated as part of the integrated circuit 200, in accordance with some embodiments of the invention.

The amplifier 244 provides a voltage, which is indicative of the sensed current in the BJT's main current path to the power supply controller 250, and the power supply controller 250 provides a corresponding control signal to the amplifier 254. The amplifier 254 receives the $V_R$ regulated voltage and generates a signal that is applied to the base terminal of the BJT 234 based on the difference between the $V_R$ regulated voltage and the control signal that is provided by the power supply controller 250. Depending on the particular embodiment of the invention, the regulator 230 may be disposed in its entirety externally to the integrated circuit 200, may be disposed in its entirety off of the integrated circuit, may be a different type of regulator (a switching, or switch-mode regulator, for example) other than a linear pass regulator, etc.

The regulator 230 may have a variety of different potential designs other than the design that is depicted in FIG. 3. For example, in accordance with some embodiments of the invention, in an alternate design, the BJT 234 may be replaced with a PNP BJT, an n-channel metal oxide semiconductor field effect transistor (MOSFET) or a p-channel MOSFET. As another variation, in accordance with other embodiments of the invention, the current sensing resistor 240 may be alternatively coupled between the $V_R$ regulated voltage and the emitter terminal of the BJT 234. Thus, many variations are contemplated and are within the scope of the appended claims.

As depicted in FIG. 3, the high voltage subsystem 112 may include a plurality of the current drivers 210, which are fabricated as part of the die 200. In accordance with some embodiments of the invention, each driver 210 has a relatively high current carrying capability, and each driver 210 is constructed to operate on relatively high voltage signals (signals that exceed the fabrication-imposed maximum voltage threshold, for example) that are received at its output terminal 84d or supply terminal 84e and 84f. As a non-limiting example, in accordance with some embodiments of the invention, the driver 210 has a source current capability (for current sourced from terminal 84e) of approximately 150 milliamps (mA) and a sink current capability (for current that sinks into the terminal 840 of approximately 300 mA.

As further described herein, the high voltage and high current carrying capability of the driver 210 permits the driver 210 to perform functions that have conventionally been performed by discrete external components that are not part of the MCU 24. However, due to the drivers 210 being fabricated as part of the MCU 24, the MCU 24 may directly perform these functions, without requiring the additional discrete components, thereby decreasing costs of the system in which the MCU 24 is deployed, such as the transceiver system 10. As non-limiting examples, the current drivers 210 may be used for relatively high voltage and current applications, such as power distribution management, motor control, light emitting diode (LED) control, etc.

In accordance with some embodiments of the invention, the drivers 210 are electrically coupled to a positive supply rail terminal 84e and a negative supply rail terminal 84f. As described below, a given driver 210 may be configured to either source current from the positive supply rail terminal 84e to the output terminal 84d or sink current from the output terminal 84d to the negative supply rail terminal 84f. The positive 84e and negative 84f supply rail terminals may be external contact pads of the integrated circuit 200, in accordance with some embodiments of the invention. As depicted in FIG. 3, the high voltage subsystem 112 may include an electrostatic discharge clamping circuit 214 that is electrically coupled between the terminals 84e and 84f, in accordance with some embodiments of the invention.

The drivers 210 may be controlled using a number of different independent sources that provide control signals for turning on and off the drivers 210, depending on the particular embodiment of the invention. For example, in accordance with some embodiments of the invention, one or more of the drivers 210 may be controlled by signals on a terminal 84c that receives control signals generated by the processor core 150. In this regard, in accordance with some embodiments of the invention, the terminals 84c may be coupled to one or more software-writable registers of the MCU 24, which the processor core 150 may write data (in response to executing at least one instruction) for purposes of selectively turning on or off the drivers 210.

The drivers 210 may be controlled by other sources. For example, in accordance with some embodiments of the invention, one or more the drivers 210 may be controlled via signals that are received over communication terminals 84a. In some embodiments of the invention, the terminals 84a are electrically coupled to external pads of the integrated circuit 200. One way in which this control scheme may be used is that a digital component 90 (see FIG. 2) of the MCU 24 may communicate a signal to a particular output terminal 82 (see FIG. 2) of the MCU 24, and then this signal is routed back to one of the terminals 84a for purposes of controlling a given driver 210.

For purposes of routing the control signals from the terminals 84a to the drivers 210, in accordance with some embodiments of the invention, the high voltage subsystem 112 includes an input/output (I/O) multiplexer 220, which generally configures the drivers 210. The I/O multiplexer 220 contains a crossbar switch 222 that may be programmed (by the processor core 150, for example) with a mapping to control the connections between the terminals 84a and the control terminals of the drivers 210. Thus, the crossbar switch 222 may be programmed to connect a given terminal 84a to the control terminal of a given driver 210. Moreover, as depicted in FIG. 3, the crossbar switch 222 may further be programmed with mappings between other external terminals 84b of the MCU 24 and the drivers 210 and mappings between internal terminals 84c of the MCU 24 and the drivers 210. Thus, many variations are contemplated and are within the scope of the appended claims.

Among the other features of the high voltage subsystem 112, in accordance with some embodiments of the invention, the subsystem 112 may include additional regulators, such as a low dropout regulator 224 that is coupled to an external power supply rail via an external terminal 84g and provides a corresponding regulated voltage to another external power supply rail via an external terminal 84h. The high voltage subsystem 112 may also include analog level-translation input stages 260 that are coupled to external terminals 84i for purposes of translating high voltage analog signals into low voltage analog signals, which may then be processed by low voltage analog circuits 270 of the subsystem 112. As non-limiting examples, such low-voltage analog circuits 270 may include analog-to-digital converters, voltage comparators, and voltage monitoring circuits.

Figure 4:
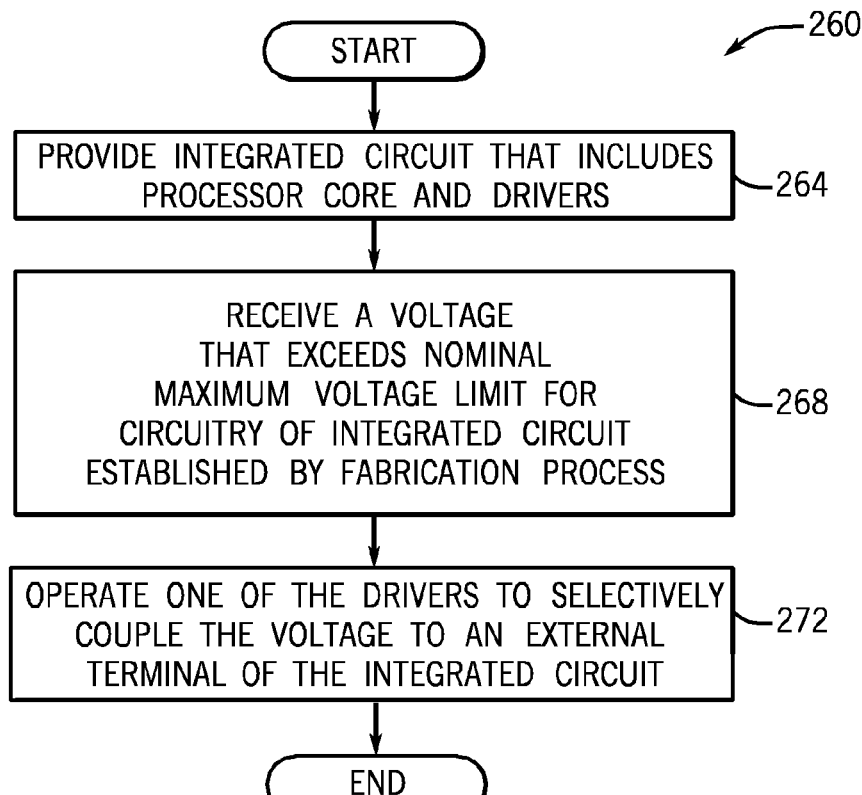
FIG. 4 is a flow diagram depicting a technique employed by the analog interface of the microcontroller unit to control circuitry external to the microcontroller unit according to an embodiment of the invention.

To summarize, referring to FIG. 4 in conjunction with FIGS. 2 and 3, in accordance with embodiments of the invention described herein, a technique 260 includes providing (block 264) an integrated circuit that includes a processor core and current drivers. The technique 260 includes receiving (block 268) a voltage that exceeds a nominal maximum voltage for circuitry of the integrated circuit, as established by the integrated circuit's fabrication process. The technique 260 includes operating at least one of the drivers to selectively electrically couple the voltage to an external terminal of the integrated circuit (couple the voltage to an LED, a motor, a secondary supply rail, etc.), pursuant to block 272.

The drivers 210 may be used to electrically couple a given voltage to a variety of different electrical loads, or circuits, such as memory devices (SRAM devices, for example), the radio 28 (see FIG. 1) switched loads (such as light emitting diodes (LEDs), relays, lamps and motors), etc. In accordance with embodiments of the invention in which a given driver 210 controls a switched load, the driver 210 may receive a control signal from the MCU 24 via the input terminal 84c. As a non-limiting example, this control signal may be a pulse width modulated (PWM) signal that is generated, for example, by a timer of the MCU 24. The use of the PWM signal allows a variable power to be communicated through the driver 210 to a relatively high current load, such as a motor or an LED.

The power to a given load may be supplied by more than one driver 210, in accordance with some embodiments of the invention. For example, in accordance with some embodiments of the invention, two drivers may be coupled together in an H-bridge configuration, in which two pull up devices and two pull down devices of the drivers 210 are coupled together to allow the application of a differential voltage to the load. Two of the drivers 210 may be used to create such an H-bridge (i.e., a circuit having two branches, each of which includes a pair of transistors coupled in series) for relatively high power loads. Alternatively, in accordance with other embodiments of the invention, four drivers 210 may be configured to drive four external power MOSFETs, which are configured as an H-bridge for higher power applications. Other variations are contemplated and are within the scope of the appended claims.

FIG. 5 depicts an exemplary application for the MCU 24 and its drivers 210, in accordance with some embodiments of the invention. For this example, the MCU 24 forms part of a power distribution system 300 for purposes of controlling the distribution of power from a power supply rail 302 that has the $V_S$ supply voltage to secondary supply rails 320, 330 and 340 that supply power to various semiconductor packages 350. As a non-limiting examples, the semiconductor packages 350 may include such devices as memories (static random access (SRAM) memories, for example), switched loads and the radio 28 (see FIG. 1). As a further example, the switched loads may include light emitting diodes (LEDs), relays, lamps, motors, etc. As a non-limiting example, the power supply rail 302 may be electrically coupled through the USB interface 25 (see FIG. 1) to the power supply line of the USB 40.

Using the MCU 24 and its drivers 210 as a part of the power distribution system 300 may have certain advantages for the scenario in which components are powered by the USB's power supply line. In this regard, a USB bus-powered system may have strict limitations on the current that may be drawn from the power supply line of the USB. For example, there may be restrictions on both the maximum transient (or plug-in) current and restrictions on the steady state current drawn from the USB bus' power supply line. As a non-limiting example, the steady state current limit may be a limit of 100 milliamps (mA) at 5 volts if the device consuming the power is connected to a non-powered USB hub, and the steady state current limit may be 500 mA at 5 volts if the power consuming device is drawing power from a powered hub.

Due to the inclusion of the MCU 24 as part of the power distribution system 300, in accordance with some embodiments of the invention, the MCU 24 serves as the master power controller to allow customers to program the drivers 210 to turn on various downstream devices in sequence or to ramp the current being supplied to these devices using a current limiting feature of the drivers 200, which is discussed further below. This may be particularly useful for the USB systems but also may be applicable to controlling the communication of power from another power source, because the power source may have some limit on the maximum static and dynamic loading current.

As shown in FIG. 5, for the power distribution system 300, the regulator 230 converts the $V_S$ supply voltage into the lower $V_R$ regulated voltage; and the drivers 210 of the MCU 24 control the coupling of the $V_R$ regulated voltage to the secondary supply rails 320, 330 and 340. For example, the MCU 24 may, through the execution of software instructions on the processor core 150 (see FIG. 2), as a non-limiting example, control the drivers 210 to selectively form electrical connections between the $V_R$ regulated voltage and the secondary supply rails 320, 330 and 340. In particular, for the example depicted in FIG. 5, two of the drivers 210 have current paths that are selectively controlled for purposes of selectively coupling the $V_R$ regulated voltage to the rails 320 and 340. For this application, the current through the supply rails 320 and 340 passes through the main current paths of the drivers 210.

As also depicted in FIG. 5, however, the drivers 210 may be used in applications in which the main supply current does not pass through the main current paths of the drivers 210. For example, FIG. 5 depicts a driver 210 of the MCU 24 being electrically coupled to the gate terminal of a p-channel metal-oxide field-effect-transistor (pMOSFET) 332, with the source and drain terminals being coupled to the $V_R$ regulated voltage and the secondary supply rail 330, respectively. Therefore, when this driver 210 is activated, or turned on, the driver 210 causes the pMOSFET 332 to conduct to couple the $V_R$ regulated voltage to the secondary supply rail 330.

Among the other features of the power distribution system 300, the system 300 may include at least one additional regulator to supply at least one additional regulated voltage from the $V_S$ supply rail. For example, in accordance with some embodiments of the invention, the power distribution subsystem 300 may include a regulator 306 (a low dropout regulator, for example), which has a input terminal 307 that is coupled to the $V_S$ supply rail 302 and provides a corresponding regulated voltage to another secondary power supply rail 310. The power distribution system 300 may also include a battery charger 304 that charges a battery 305 with power derived from the USB power supply rail $V_S$. Other variations are contemplated and are within the scope of the appended claims.

Thus, due to the arrangement that is depicted in FIG. 5, the drivers 210 may be powered from a relatively high $V_S$ voltage that exceeds (for example) the nominal maximum voltage established by the MCU's fabrication process as well as be powered from a lower regulated $V_R$ voltage that is within the maximum voltage, depending on the particular system requirements. For example, in a USB bus-powered application, some of the semiconductor packages 350 may be powered directly from the $V_S$ voltage rather than from a lower voltage. However, by coupling these semiconductor packages 350 through the current-limited drivers 210, the USB specifications for maximum transient current may be maintained. It is noted that in some applications, the semiconductor packages 350 may use relatively large supply decoupling capacitors, which sink relatively large amounts of transient current when the devices are initially coupled to the power supply rail. However, due to the current limiting of the drivers 210, the magnitude of the power up transient currents, are limited to comply with the USB specifications.

Additionally, the drivers 210 permit the semiconductor packages 350 to operate from voltages that are lower than the $V_S$ voltage that is supplied from, for example, the power supply line of the USB 40. In this regard, one or more of the semiconductor packages 350 may have the same maximum voltage as the MCU 24. The combination of the relatively high current regulator 230 with the high current drivers 210 provides voltage protection for the semiconductor packages 350 when the packages 350 are powered from the regulator 230 output, as shown in FIG. 5.

Additionally, the driver's current limiting feature serves as protection for the entire system, in accordance with some embodiments of the invention. In this manner, if one of the semiconductor packages 350 has a fault condition (an internal short circuit, for example), which causes the package 350 to draw a relatively high level of current, the package 350 would, if not for the driver 210, cause a fault of the entire power supply network. Thus, in effect, the drivers 210 may be used as "circuit breakers" to protect the integrity of the power distribution system 300 from a fault arising in one of the circuits.

Figure 6:
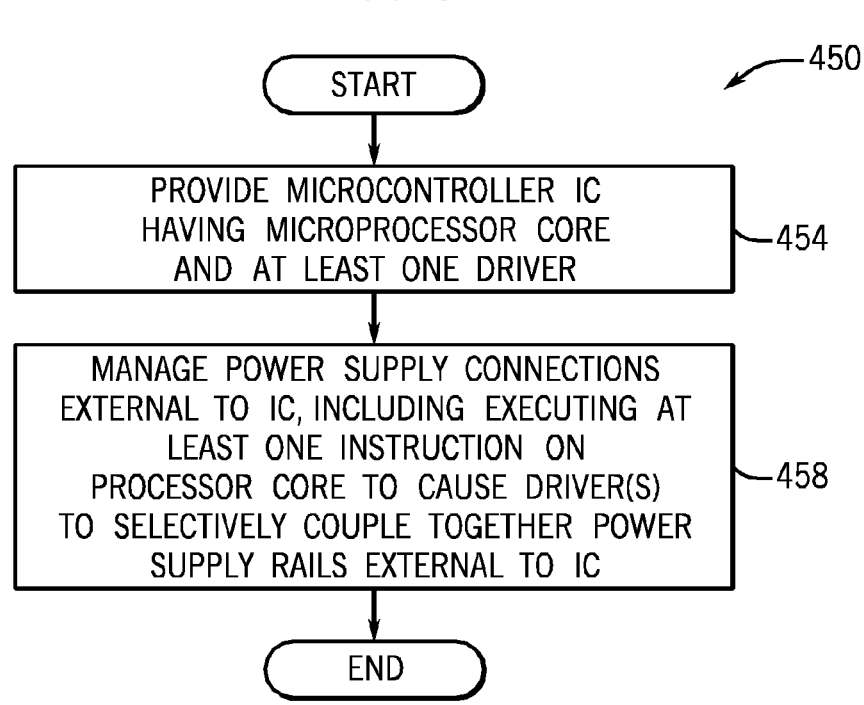
FIG. 6 is a flow diagram depicting a technique to use the microcontroller unit to manage connections in a power distribution system according to an embodiment of the invention.

Referring to FIG. 6, to summarize, a technique 450 in accordance with some embodiments of the invention includes providing (block 454) a microcontroller integrated circuit that has a processor core and at least one driver. The technique includes managing (block 458) power supply connections that are external to the integrated circuit, including executing at least one instruction on the processor core to cause the driver(s) to selectively couple together power supply rails that are external to the integrated circuit.

Figure 7:
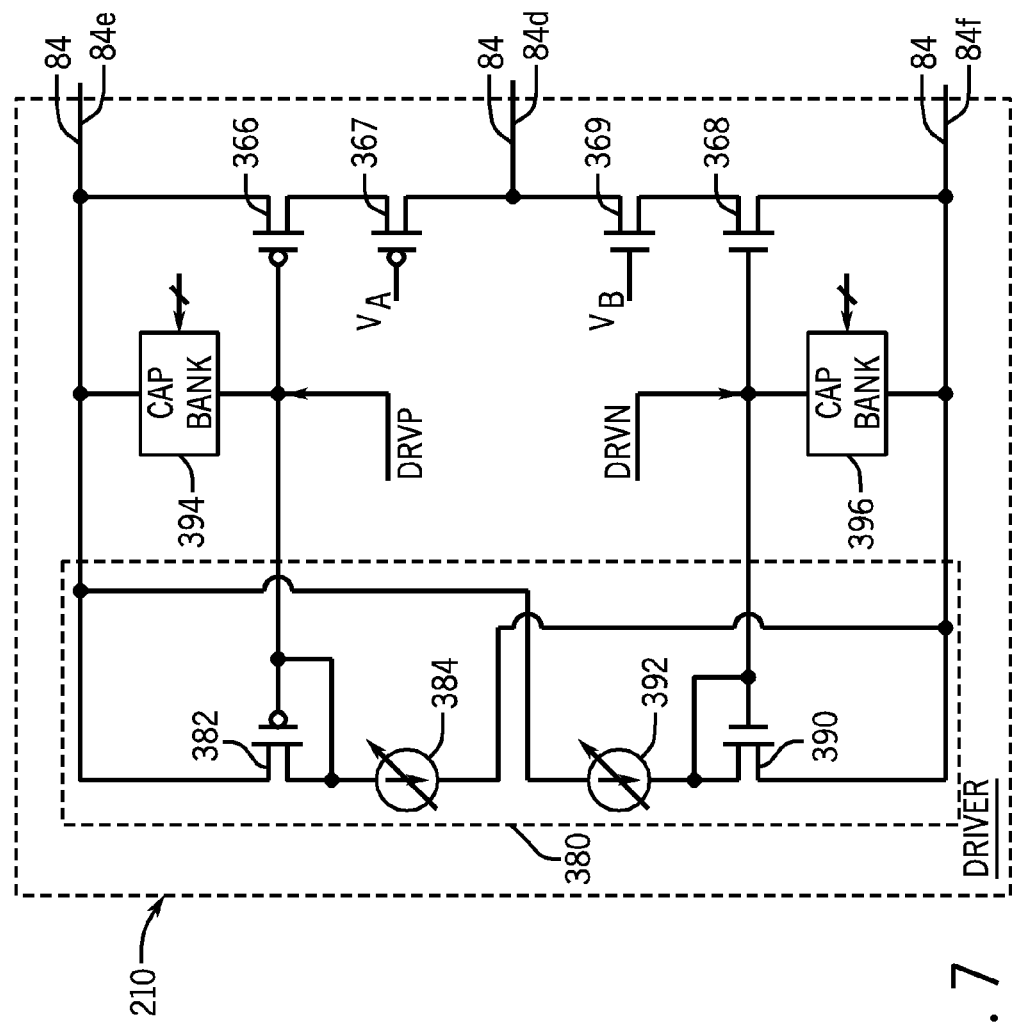
FIG. 7 is a schematic diagram of a driver of the analog interface of the microcontroller unit according to an embodiment of the invention.

Referring to FIG. 7, in accordance with some embodiments of the invention, the driver 210 is a push-pull driver that may either be configured to operate in a push mode in which the driver 210 is operated to selectively couple the positive supply rail terminal 84e to the output terminal 84d to source current or in a pull mode in which the driver 210 is operated to selectively couple the negative supply rail terminal 84f to the output terminal 84d to sink current.

For the exemplary design that is depicted in FIG. 7, the driver 210 includes a p-channel MOSFET 366 (hereinafter called the "pMOSFET 366"), which has its source terminal coupled to the positive supply rail terminal 84e and its drain terminal coupled to the output terminal 84d. The driver 210 further includes an n-channel MOSFET 368 (hereinafter called the "nMOSFET 368"), which has its drain terminal coupled to the output terminal 84d and its source terminal coupled to the negative supply rail terminal 84f. The gate terminal of the pMOSFET 366 receives a signal (called "DRVP" herein); and the gate terminal of the nMOSFET 368 receives a signal (called "DRVN" herein).

Therefore, when the driver 210 is configured to operate in the push mode of operation, the DRVN signal remains de-asserted, or driven low, to turn off the nMOSFET 368; and the DRVP signal is controlled accordingly to selectively couple the positive supply rail terminal 84e to the output terminal 84d. When the driver 210 is configured to operate in the pull mode of operation, the DRVP signal remains de-asserted, or driven high, to turn off the pMOSFET 366; and the DRVN signal is controlled accordingly to selectively couple the negative supply rail terminal 84f to the output terminal 84d.

The driver 210 further contains features that permit the driver 210 to receive and operate with voltages that exceed the nominal maximum voltage threshold that is established by the fabrication process. In accordance with some embodiments of the invention, the driver 210 includes another pMOSFET 367 in the current path of the pMOSFET 366 and another nMOSFET 369 in the current path of the nMOSFET 368. More specifically, source-to-drain current path of the pMOSFET 367 is in series with the source-to-drain current path of the pMOSFET 366, as the drain terminal of the pMOSFET 367 is coupled to the output terminal 84d, and the source terminal of the pMOSFET 367 is coupled to the drain terminal of the pMOSFET 366. The drain-to-source current path of the nMOSFET 369 is in series with the drain-to-source current path of the nMOSFET 368, as the drain terminal of the nMOSFET 369 is coupled to the output terminal 84d, and the source terminal of the nMOSFET 367 is coupled to the drain terminal of the nMOSFET 368.

The gate terminals of the nMOSFET 367 and pMOSFET 369 receive bias voltages, called $V_A$ and $V_B$, respectively, in FIG. 7. As a non-limiting example, in accordance with some embodiments of the invention, the $V_A$ and $V_B$ bias voltages may each be a voltage near the midpoint between the voltages of the supply rail terminals 84e and 84f. Moreover, in accordance with some embodiments of the invention, the gate terminals of the nMOSFET 367 and pMOSFET 369 may be electrically coupled together and receive the same bias voltage. Regardless of the particular implementation, the nMOSFET 367 and pMOSFET 369 prevent the voltages appearing across the terminals of any of the driver's transistors from exceeding the maximum voltage threshold, irrespective of the voltage that is received at the driver's terminals 84d, 84e and/or 84f, provided that the voltage difference across terminals 84d, 84e, and/or 84f does not exceed approximately twice the maximum voltage threshold.

It is noted that the nMOSFET 369 and pMOSFET 367 are merely an example of one possible embodiment of a design for the driver 210 to allow the driver 210 to receive and operate with voltages that exceed the maximum threshold voltage. Thus, other designs to allow the driver 210 to receive and operate with relatively high voltages are contemplated and are within the scope of the appended claims.

Among the other features of the driver 210, in accordance with some embodiments of the invention, the driver 210 includes circuitry to programmably control the slew rate of the driver 210. As a non-limiting example, in accordance with some embodiments of the invention, a programmable capacitor bank 394 is coupled between the positive supply rail 84e and the gate terminal of the pMOSFET 366. In general, the capacitor bank 394 contains capacitors and switches that may be selectively activated and deactivated for purposes of programmably establishing a gate-to-source capacitance across the pMOSFET 366. In this regard, in accordance with some embodiments of the invention, the processor core 150 (generally the MCU 24) may program a particular capacitive value for the capacitor bank 394 for purposes of programming a slew rate for the driver 210. The driver 210 also includes a capacitor bank 396 that is also programmable to establish the slew rate by establishing programmable gate to source capacitance for the nMOSFET 368. Like the capacitor bank 394, the capacitance value of the capacitor bank 396 may be programmed by the processor core 150 (generally the MCU 24).

Among its other features, the driver 210 may also include a programmable current limit. For example, in accordance with some embodiments of the invention, the driver 210 has a programmable source current limit that is established by a current minor that is formed by a pMOSFET 382, the pMOSFET 366 and an adjustable, or programmable, current source 384 (a digital-to-analog converter (DAC) having a programmable analog output current that is a function of a set of input bits, for example). The source terminal of the pMOSFET 382 is coupled to the positive supply rail 84e; and the gate and drain terminals of the pMOSFET 382 are coupled together and coupled to one terminal of the current source 384. The other terminal of the current source 384, in turn, is coupled to the negative supply rail 84f. Due to this arrangement, when the pMOSFET 366 conducts current through its source-drain path, the maximum current through this path is proportional to the current established by the current source 384.

In a similar arrangement, to establish the sink current limit, the driver 210 may include a current mirror formed from an nMOSFET 390, the nMOSFET 368 and a programmable current source 392. The gate and drain terminals of the nMOSFET 390 are coupled together and coupled to one terminal of the current source 392. The other terminal of the current source 392 is coupled to the positive supply rail 84e, and the source terminal of the nMOSFET 390 is coupled to the negative supply rail 84f. Due to this arrangement, the current source 392 may be programmed to establish the maximum current for the drain source current path of the nMOSFET 368 when the nMOSFET 368 is turned on. In accordance with some embodiments of the invention, the current sources 384 and 392 may be programmed using registers that are accessible via writes by the processor core 150 (generally the MCU 24) (see FIG. 2).

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. An apparatus comprising:
   an integrated circuit comprising a processor and a driver, the integrated circuit being fabricated by a process establishing a nominal maximum voltage for components of the integrated circuit,
   wherein the driver is adapted to selectively electrically couple a voltage higher than the nominal maximum voltage to an external terminal of the integrated circuit,
   wherein the processor is adapted to control the driver to selectively couple together power supply rails, at least one of the power supply rails being external to the integrated circuit.

2. The apparatus of claim 1, wherein the integrated circuit further comprises:
   a voltage regulation circuit adapted to receive the higher voltage and furnish a regulated voltage less than the maximum voltage.

3. The apparatus of claim 2, wherein the integrated circuit further comprises:
   a serial bus interface adapted to couple a power line of a serial bus to an input terminal of the voltage regulation circuit.

4. The apparatus of claim 3, wherein the serial bus interface comprises a Universal Serial Bus (USB) interface adapted to couple a power line of a Universal Serial Bus to the input terminal of the voltage regulation circuit.

5. The apparatus of claim 2, wherein the processor is adapted to control the driver to selectively couple the regulated voltage to a power supply rail.

6. The apparatus of claim 1, wherein the processor is adapted to control the driver to manage a distribution of power derived from a power line of a Universal Serial Bus (USB).

7. The apparatus of claim 1, wherein the processor is adapted to control the driver to control provision of power to a load external to the integrated circuit.

8. The apparatus of claim 1, wherein the driver comprises a current path and a current limiter adapted to establish a programmable maximum limit for current in the current path.

9. The apparatus of claim 1, wherein the driver comprises a slew rate controller adapted to control a slew rate of the voltage.

10. A method comprising:
    using an integrated circuit comprising a processor and a driver to control provision of power to a load external to the integrated circuit, the integrated circuit being fabricated by a process establishing a nominal maximum voltage for circuit components of the integrated circuit; and
    selectively operating the driver to couple a voltage higher than the nominal maximum voltage to the load, wherein operating the driver comprises executing at least one instruction by the processor to selectively couple together power supply rails, at least one of the power supply rails being external to the integrated circuit.

11. The method of claim 10, further comprising using a voltage regulation circuit integrated within the integrated circuit to regulate the voltage.

12. The method of claim 10, further comprising managing a distribution of power derived from a power line of a Universal Serial Bus by executing at least one instruction on the processor to control the driver.

* * * * *